United States Patent
Ko

(10) Patent No.: US 9,007,937 B2
(45) Date of Patent: Apr. 14, 2015

(54) TECHNIQUES FOR SEGREGATING CIRCUIT-SWITCHED TRAFFIC FROM PACKET-SWITCHED TRAFFIC IN RADIO ACCESS NETWORKS

(75) Inventor: Bong Jun Ko, Harrington Park, NJ (US)

(73) Assignee: International Business Machines Corporation, Armonk, NY (US)

(*) Notice: Subject to any disclaimer, the term of this patent is extended or adjusted under 35 U.S.C. 154(b) by 259 days.

(21) Appl. No.: 13/487,170

(22) Filed: Jun. 2, 2012

(65) Prior Publication Data

US 2013/0322270 A1    Dec. 5, 2013

(51) Int. Cl.
| | |
|---|---|
| *H04W 72/00* | (2009.01) |
| *H04L 12/725* | (2013.01) |
| *H04L 12/859* | (2013.01) |
| *H04L 12/26* | (2006.01) |
| *H04L 12/801* | (2013.01) |
| *H04L 12/851* | (2013.01) |

(52) U.S. Cl.
CPC .............. *H04L 45/304* (2013.01); *H04L 43/028* (2013.01); *H04L 45/306* (2013.01); *H04L 47/14* (2013.01); *H04L 47/2408* (2013.01); *H04L 47/2441* (2013.01); *H04L 47/2475* (2013.01)

(58) Field of Classification Search
None
See application file for complete search history.

(56) References Cited

U.S. PATENT DOCUMENTS

| | | | |
|---|---|---|---|
| 2005/0250505 A1* | 11/2005 | Rasanen | 455/450 |
| 2008/0161054 A1 | 7/2008 | Kallio et al. | |
| 2009/0010247 A1 | 1/2009 | Stille | |
| 2010/0054201 A1* | 3/2010 | Gotare | 370/329 |
| 2010/0172289 A1 | 7/2010 | Holma et al. | |
| 2012/0033581 A1* | 2/2012 | Torres Ramon et al. | 370/253 |

FOREIGN PATENT DOCUMENTS

| | | | |
|---|---|---|---|
| DE | 3804283 A1 | | 8/1989 |
| WO | WO2010089445 A1 | | 8/2010 |

OTHER PUBLICATIONS

Scheets et al., "Voice Over the Internet: A Tutorial Discussing Problems and Solutions Associated with Alternative Transport," IEEE Communications Surveys and Tutorials, Second Quarter 2004, vol. 6, No. 2.

DE3804283 A1 (English Abstract) Standard Elektrik Lorenz, Ohnsorge Aug. 24, 1989.

* cited by examiner

*Primary Examiner* — Sulaiman Nooristany
(74) *Attorney, Agent, or Firm* — Jennifer R. Davis; Michael J. Chang, LLC

(57) ABSTRACT

A computer-based method for processing user data traffic in a RAN in which mobile user equipment can communicate with a RNC through a base station includes the following steps. A flow of data frames to/from mobile user equipment passing between the base station and the RNC are read, wherein one or more of the data frames contain control messages and one or more other of the data frames contain user data. The control messages contained in the data frames are analyzed for channel identification information that indicates whether the data frames that contain user data contain circuit-switched or packet-switched user data. The data frames that contain the circuit-switched user data and the data frames that contain the packet-switched user data are segregated at a transport network layer between the base station and the RNC based on the channel identification information.

21 Claims, 7 Drawing Sheets

200

400

TECHNIQUES FOR SEGREGATING CIRCUIT-SWITCHED TRAFFIC FROM PACKET-SWITCHED TRAFFIC IN RADIO ACCESS NETWORKS

FIELD OF THE INVENTION

The present invention relates to data flow in a Radio Access Network (RAN) of wireless cellular networks and more particularly, to techniques for segregating circuit-switched (CS) traffic from packet-switched (PS) traffic in a RAN of wireless cellular networks.

BACKGROUND OF THE INVENTION

With the increasing usage of Internet in wireless networks, IP breakout (or IP offload) solutions are becoming very useful mechanism to alleviate bandwidth overload problems in backhaul and core network links in cellular networks. An IP breakout solution provides a redirection point within radio access network and/or core network so that Internet traffic (a.k.a. packet-switched data) to and from user equipments can be offloaded directly to the public network, bypassing radio access and core network links of cellular network providers. In 3rd generation wireless networks (3G Wireless in short), like UMTS (Universal Mobile Terrestrial System), however, both of the circuit-switched data (e.g., voice call, video call data) and the packet-switched data are carried over by the same network resources (NodeB, RNC, UE, and the interfaces between them) inside RAN (Radio Access Network), where circuit-switched traffic should not be offloaded directly to the public network—instead circuit-switched data should be carried on their normal paths toward the core network that handles such traffic.

Segregating the circuit-switched traffic efficiently is important because circuit-switched traffic typically has stringent requirements on their latency. Thus it should not take excessive amount of time and processing to make the decision as to whether given data packet is part of circuit-switched traffic or packet-switched traffic.

Therefore, techniques for efficiently segregating circuit-switched traffic from packet-switched traffic within a RAN would be desirable.

SUMMARY OF THE INVENTION

The present invention relates to regulating data flow in a Radio Access Network (RAN) of wireless cellular networks. In one aspect of the invention, a computer-based method for processing user data traffic in a radio access network in which mobile user equipment can communicate with a Radio Network Controller (RNC) through a base station is provided. The method includes the following steps. A flow of data frames to and from the mobile user equipment passing between the base station and the Radio Network Controller (RNC) (i.e., through the wired link between the base station and the Radio Network Controller (RNC) (or 'backhaul link')) are read, wherein one or more of the data frames contain control messages and one or more other of the data frames contain user data. The control messages contained in the data frames are analyzed for channel identification information that indicates whether the data frames that contain the user data contain circuit-switched user data or packet-switched user data. The data frames that contain the circuit-switched user data and the data frames that contain the packet-switched user data are segregated at a transport network layer between the base station and the Radio Network Controller (RNC) based on the channel identification information. For instance, patterns in the flow of the data frames and/or signatures of the data frames can be analyzed at the transport network layer, and the patterns/signatures can be matched with known patterns of circuit-switched user data and packet-switched user data/with known signatures of data frames that contain circuit-switched user data and packet-switched user data, respectively.

A more complete understanding of the present invention, as well as further features and advantages of the present invention, will be obtained by reference to the following detailed description and drawings.

DETAILED DESCRIPTION OF PREFERRED EMBODIMENTS

Provided herein are techniques for segregating circuit-switched traffic from packet-switched traffic within a Radio Access Network (RAN). More specifically, the present teachings provide methods to distinguish and segregate the circuit-switched traffic at a stage as early as possible, especially before incoming data goes through expensive processing such as (de)ciphering, (de)fragmentation, (de)multiplexing, etc., at higher layers of the protocol stack.

While the most of the following description of the present techniques is made within the context of the 3G wireless/cellular network defined within 3GPP standard, called UMTS (Universal Mobile Terrestrial System), the same concepts and methods can be applied in the same manner as described to other types of 3G mobile networks, such as cdma2000 networks.

Figure 1:
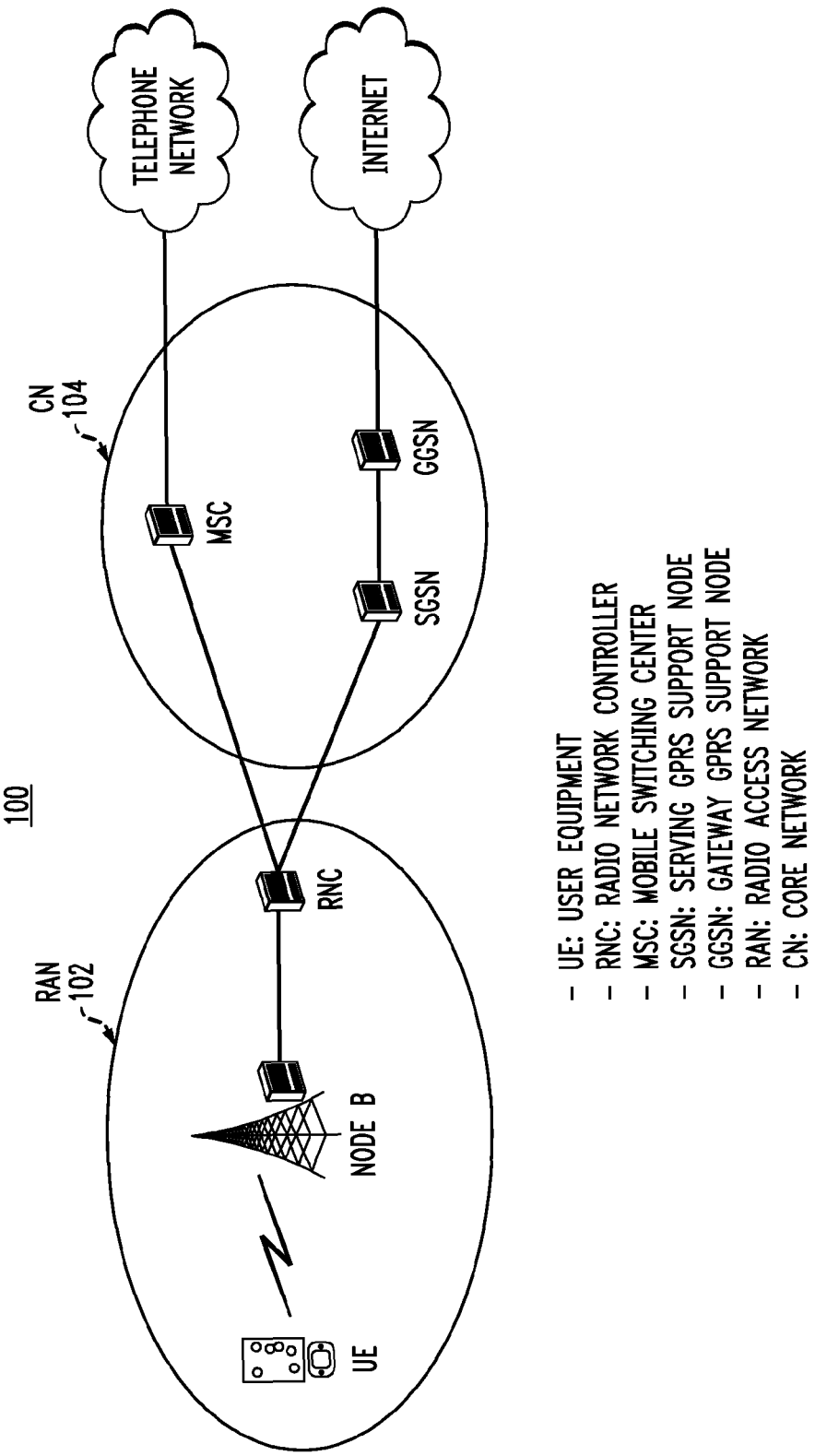
FIG. 1 is a diagram illustrating high-level architecture of a 3G cellular network according to an embodiment of the present invention.

FIG. 1 is a diagram illustrating high-level architecture of a 3G cellular network 100 which provides the framework for the present techniques. As shown in FIG. 1, 3G cellular network 100 includes a Radio Access Network (RAN) 102 and a Core Network (CN) 104. The RAN 102 is made up of one or more User Equipment (UE) (e.g., mobile telephones, PDAs, PCs, laptop computers, etc.) that communicate wirelessly with a Radio Network Controller (RNC) through a Node B (i.e., a base station) (for example the Node B is connected directly to the RNC and can receive wireless transmissions from the UE).

The CN 104 contains a Mobile Switching Center (MSC) (which handles circuit-switched (CS) traffic) and a Serving General Packet Radio Service (GPRS) Support Node (SGSN)/Gateway GPRS Support Node (GGSN) (which handles packet-switched (PS) traffic). Namely, 3G cellular network 100 supports two types of network flows or traffic: circuit-switched (CS) traffic (e.g., voice, real-time video streaming) and packet-switched (PS) traffic (e.g., web contents, youtube videos). Both CS traffic and PS traffic are handled by the same network elements of UE, NodeB, and RNC within the Radio Access Network (RAN) 102, but CS traffic and PS traffic are separately handled by different network elements in the Core Network (CN) 104. Specifically, as shown in FIG. 1, in the Core Network circuit-switched (CS) traffic is handled by the CS domain of the CN such as the MSC (Mobile Switching Center) toward a telephone network, and PS traffic is handled by the PS domain of the CN such as SGSN and GGSN toward the public data networks like the Internet.

Figure 2:
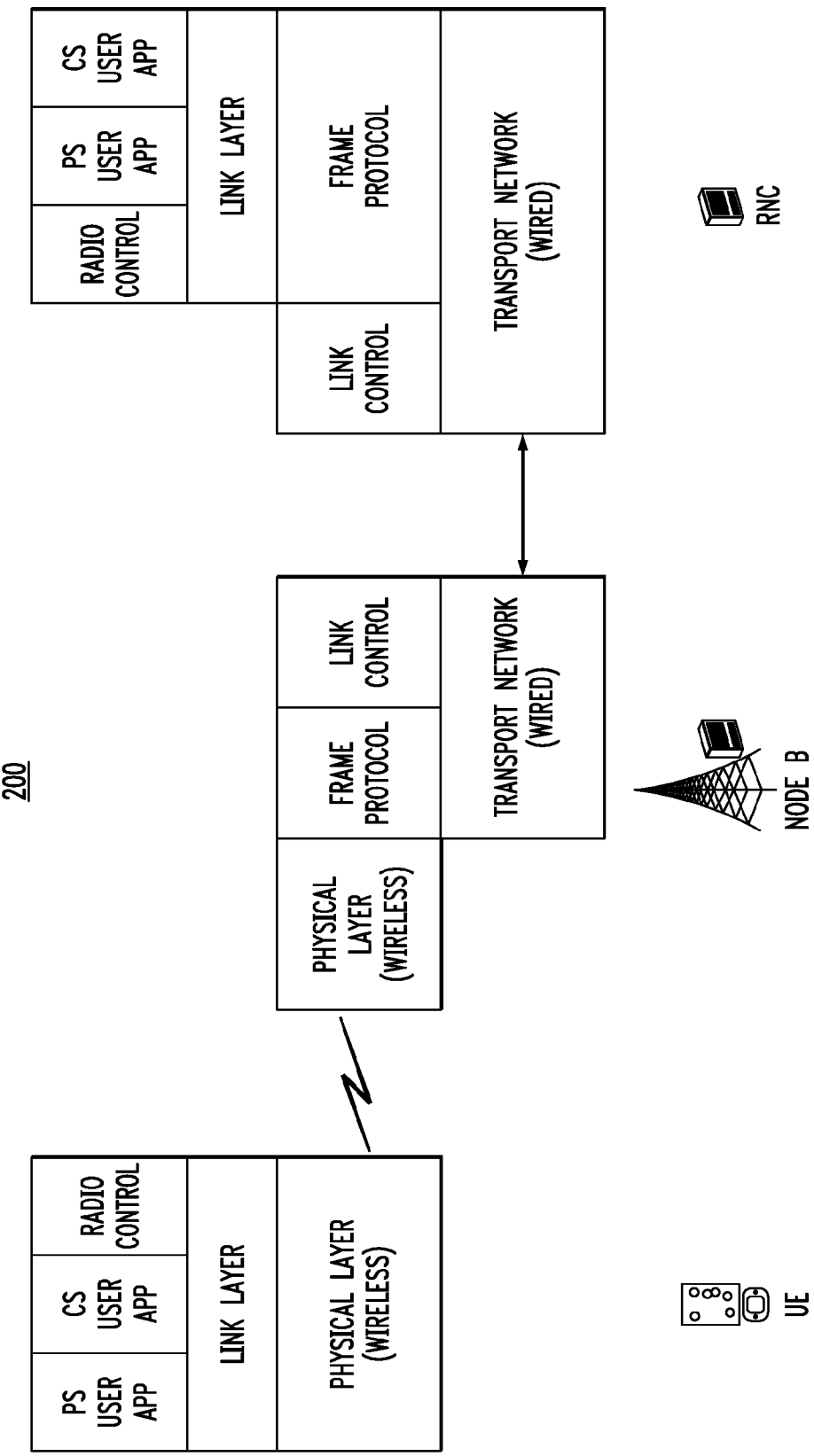
FIG. 2 is a diagram illustrating a high-level protocol architecture within the Radio Access Network (RAN) of in a 3G cellular network, such as the Radio Access Network (RAN) of the 3G cellular network of FIG. 1 according to an embodiment of the present invention.

FIG. 2 is a diagram illustrating a high-level protocol architecture 200 within the Radio Access Network (RAN) of a 3G cellular network, such as the Radio Access Network (RAN) 102 of 3G cellular network 100 of FIG. 1. As shown in FIG. 2, in 3G cellular wireless networks, circuit-switched (CS) user data traffic (e.g., voice, real-time video streaming) and packet-switched (PS) user data traffic (e.g., web contents, youtube videos) use the same network links within the Radio Access Network (RAN).

As shown in FIG. 2 with regard to the User Equipment (UE), at the top level, user data (both PS and CS traffic) are multiplexed and encapsulated into the link layer protocol frames. The link layer frames are in turn encapsulated and carried by physical layer wireless frames between the UE (User Equipment) and the NodeB (i.e., base station). When the user data are transferred by the lower layers, different user connections are assigned different logical channels (called "radio bearer"), so that the receiving end can distinguish different connections from the same physical link.

Radio Control protocol (called RRC—Radio Resource Control in 3G wireless) data, which control the formats of the data frame and the way the data frames are transmitted at the lower-layers (link layer and physical layer), are also encapsulated and carried by the same lower layers between the UE and the NodeB. In particular, the Radio Control protocol determines the assignment of logical channels to different user data connections. The Radio Control protocol data themselves are carried by a well-known logical channel.

At the NodeB, the physical layer protocol frames (which contain PS and CS user data as well as the Radio Control protocol data) are converted into the data frames in the Frame Protocol layer in the wired link between the NodeB and the RNC (also referred to herein as the "backhaul link"). Again, data frames belonging to different logical channels in the wireless link are assigned different logical channels in the Frame Protocol.

The Frame Protocol frames, which contain PS, CS, and Radio Control protocol data, are again encapsulated and carried by the underlying Transport Network Layer (TNL) in the wired link between the NodeB and the RNC. Again, data belonging to different logical channels in the Frame Protocol are assigned to and carried by different logical channels in the TNL.

A link control protocol (called Node B Application Part (NBAP) in UMTS) is used between the NodeB and the RNC to control the data transfer between the NodeB and the RNC. In particular, the link control protocol specifies mapping of the logical channels in a wireless link, which contain different user data connections, into different logical channels in a Frame Protocol layer. The link control protocol also specifies the mapping of the logical channels in the Frame Protocol layer into the channels in the TNL.

Each logical channel in different protocol layers and in different links is identified either by an identifier within the packet header of the data frame in its respective protocol layer or by a feature (e.g., channelization code in the wireless physical link) that is unique within the shared link. When PS data packets are broken out from the link between NodeB and RNC by an IP offloading device within the Radio Access Network (RAN), there needs to be an efficient method to separate CS traffic from PS traffic, so that only PS traffic is broken out and offloaded to the public data network directly, while voice and video traffics continue to go through the mobile operator's core network. This separation of CS traffic from PS traffic by the IP offloading device at the link between NodeB and RNC needs to be done at a protocol layer as low as possible so that the processing overhead of the breakout system can be minimized. Separating CS traffic from PS traffic at a higher layer, for example, above the link layer, incurs the expense of all lower layer protocol processing.

In one exemplary embodiment of the present techniques, a method for segregating CS traffic from PS traffic is provided which involves use of information available at the link control protocols (the link control protocols may also be referred to herein collectively as "control-plane protocols"), such as RRC (Radio Resource Control) and NBAP, which indicates whether a particular high-layer user connection is a CS traffic or a PS traffic (also referred to herein as "channel identification information"). The channel identification information in the control-plane protocols are in most cases carried in well-known logical and physical channels and in well-known formats in the link between NodeB and RNC, and thus decoding this information requires substantially less processing than decoding the user data entirely. Specifically, the channel identification information can be analyzed across various protocol layers such that any higher-layer user connection identified as CS traffic by the control channel can be separated from the lower layer.

In the context of UMTS, a radio control message used to set up the wireless channel between the UE and the RNC, called a Radio Bearer Setup Message, contains one or more of pieces of information, i.e., the above-mentioned channel identification information, that can indicate whether the user connection carried by the channels in the lower layers (e.g., in the link layer and/or in the physical layer of the UE) is a CS connection or PS connection. For example, the "Origin Core Network (CN) domain" information contained in the Radio Bearer Setup Message informs of the target domain within the core network in which the user connection will be handled. This is one piece of channel identification information the Radio Bearer Setup Message contains which can be used to determine whether the user connection is a CS connection or PS connection. For example, in UMTS, if the "Origin CN domain" is set to CS, the packets belonging to this user connection are to be forwarded to and handled by the network elements in the circuit-switched core network, such as MSC (Mobile Switching Center). On the other hand, if "Origin CN domain" is set to PS, the packets belonging to this user connection are to be forwarded to and handled by the network elements in packet-switched core network, such as SGSN (Serving GPRS Support Node) and GGSN (Gateway GPRS Support Node).

Further, the parameters that define the format of the data frames in the channels at the lower layers and the characteristics of the traffic (as a flow of multiple data frames) in the lower layers at the wireless link between UE and NodeB can also indicate whether the user data connection being setup using the lower-layer channels is for CS or PS traffic. This is another piece of channel identification information which can be used to determine whether the user connection is a CS connection or a PS connection. For example, the error-correction coding rate and information coding method used in the physical layer for voice traffic is typically different from that used for the packet traffic, as the former typically requires lesser protection from the error caused in the wireless transmission. Also, in the RLC (Radio Link Control) protocol, a sub-layer within the link layer that controls the data frame transfer mode between RNC and UE, the RLC mode information contained in the Radio Bearer Setup Message is normally set as "Unacknowledged mode" for delay-sensitive CS connection. Also, the size of data blocks to be transmitted in each repetitive time slot is typically small, and this size is fixed and typically well-known as it is determined by the voice codec. As will be described in detail below, characteristics of the data flow, such as the size of the data blocks, can be used to identify CS traffic in the data flow.

The radio control message (i.e., the Radio Bearer Setup Message) also contains information about how the higher-layer user connection (i.e., radio bearer) is to be mapped to the lower-layer channels. The data frames for the user connection as well as the radio control messages to set up the connections in the wireless link are transformed to and from the Frame Protocol data frames, which in turn is encapsulated within Transport Network Layer frames, in the wired link between NodeB and RNC, where the decision and the action of breaking out particular packets or not is taken. For example, when a voice connection to a particular user is established, RNC exchanges radio control messages with NodeB to set up a channel between RNC and NodeB for the user connection being set up, which include information regarding which channel in the Transport Network Layer will carry the data frames that belong to that voice connection through the Radio Bearer-to-Transport Bearer mapping information. The way that the channels in the Transport Network Layer are defined differ by the network transport technology used between RNC and NodeB (i.e., in the case that IP protocol is used at the Transport Network Layer, each channel is typically defined by the UDP or TCP port number; if ATM (Asynchronous Transfer Mode) is used, the VCI (Virtual Channel Identifier) is used to distinguish different channels in Transport Network layer). Thus, this information too may be used to determine whether the user connection is a CS connection or a PS connection.

Figure 3:
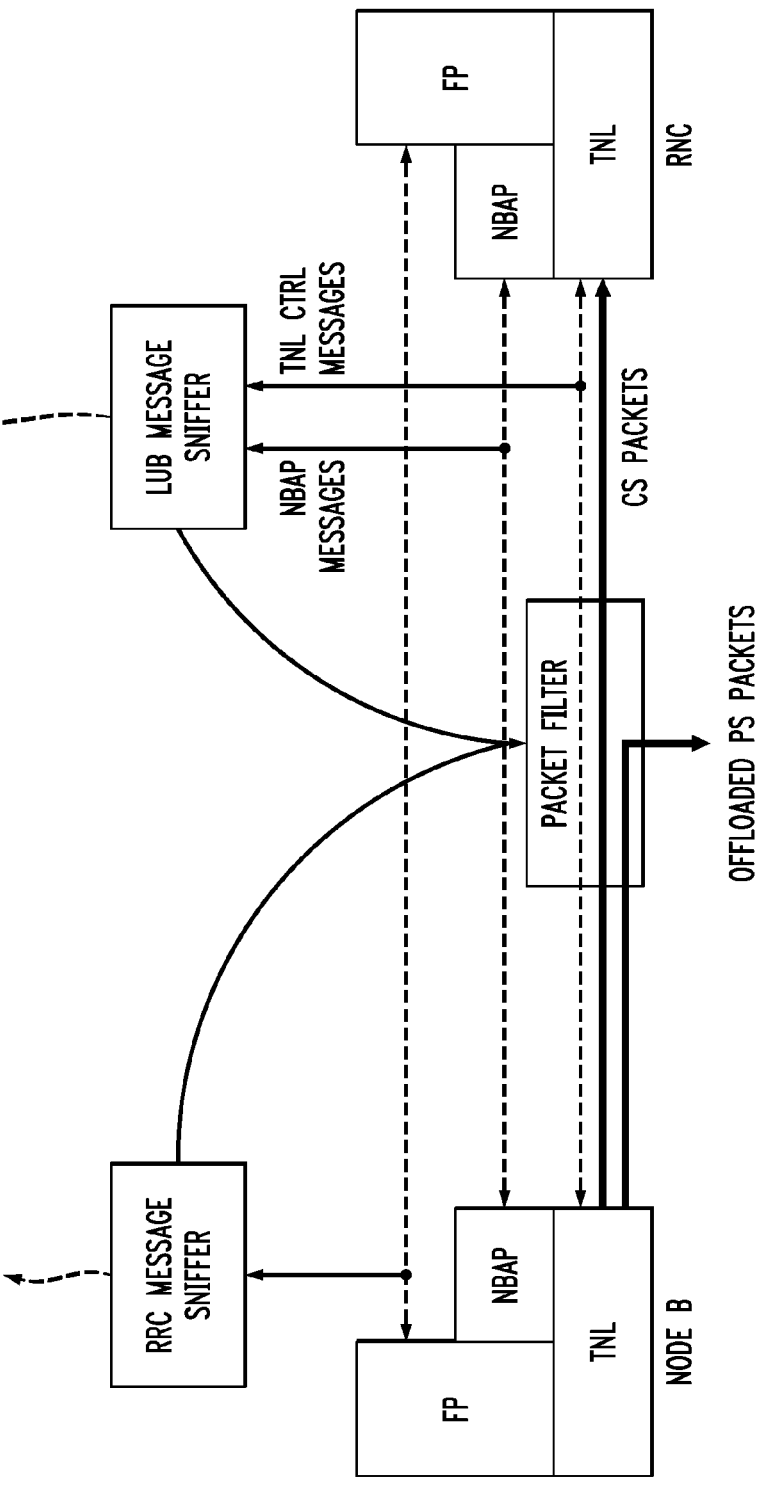
FIG. 3 is a diagram illustrating an exemplary methodology for using control-plane information to segregate circuit switched (CS) user connection traffic from packet switched (PS) user connection traffic according to an embodiment of the present invention.

FIG. 3 is a diagram illustrating an exemplary methodology 300 for using control-plane information to segregate CS user traffic from PS user traffic. In the exemplary embodiment shown illustrated in FIG. 3, a control message sniffer is employed at the link between the NodeB and the RNC. A control message sniffer is an entity that silently reads control messages passed between RNC and NodeB and decodes the contents of the control messages to extract the aforementioned information relevant to the decision of whether or not a user-plane data connection corresponding to the control message is a CS connection or PS connection. The control message sniffer only passively monitors the control messages, not intercepting the normal control message flows between RNC and NodeB.

In this exemplary embodiment, the control message sniffer is configured to read control messages, i.e., Radio Control and Link Control messages, within the TNL data frames. By way of example only, with regard to Radio Control messages (i.e., Radio Bearer Setup Messages), the control message sniffer can be used to determine: 1) whether the user connection being set up is for CS traffic or PS traffic, 2) what channels in the lower layers (between RNC and UE) are carrying the user connection in the wireless link, and 3) how those channels in the wireless link are converted to and from the channels in the Frame Protocols and then in the Transport Network Layer (TNL). See FIG. 3. As described above, the radio control messages (i.e., Radio Bearer Setup Messages) set up wireless channels between the UE and the RNC. Obtaining the radio control message is done by reading the contents within the Frame Protocol (FP) message dedicated to carrying the RRC message between the NodeB and the RNC. According to an exemplary embodiment, the control message sniffer sniffs RRC messages for origin CN domain information, physical channel information (such as rate, coding, etc.), transport channel information (such as transport block (TB) size), and/or RLC (Radio Link Control) mode information.

The channel identification information between those in the wireless link and those in the wired link is obtained by using the control message sniffer, also called an Iub message sniffer (Iub is the name of the interface between RNC and NodeB in 3G standards), to sniff the link control messages, called NBAP messages in UMTS, that are used to control the data exchange in the Frame Protocol, and corresponding control (Ctrl) messages in the Transport Network Layer (TNL) that inform of the mapping between Frame Protocol channels to Transport Network Layer (TNL) channels. The channel in the TNL corresponding to the user connection is determined by RNC and NodeB during the exchange of NBAP messages and TNL Ctrl messages, so that a channel in TNL (e.g., UDP/TCP port number, ATM VCI) is assigned and used for the data frames belonging to the user connection being established. According to an exemplary embodiment, the control message sniffer sniffs Iub control messages for radio bearer (RB)-to-Transport Bearer mapping, which informs the mapping of the user-plane connection to the TNL channel.

Once the decision is made on whether a channel in the TNL data frame carries a CS user connection traffic or a PS user connection traffic, that decision is fed into a packet filter (see FIG. 3) that monitors and segregates the data frames (e.g., by offloading packets) belonging to channels for CS connections from those for PS connections using the channel identifier information in the data frame header of Transport Network Layer. The techniques for using a control message sniffer to segregate CS traffic and PS traffic is provided with reference to FIGS. 4 and 5, below.

Figure 4:
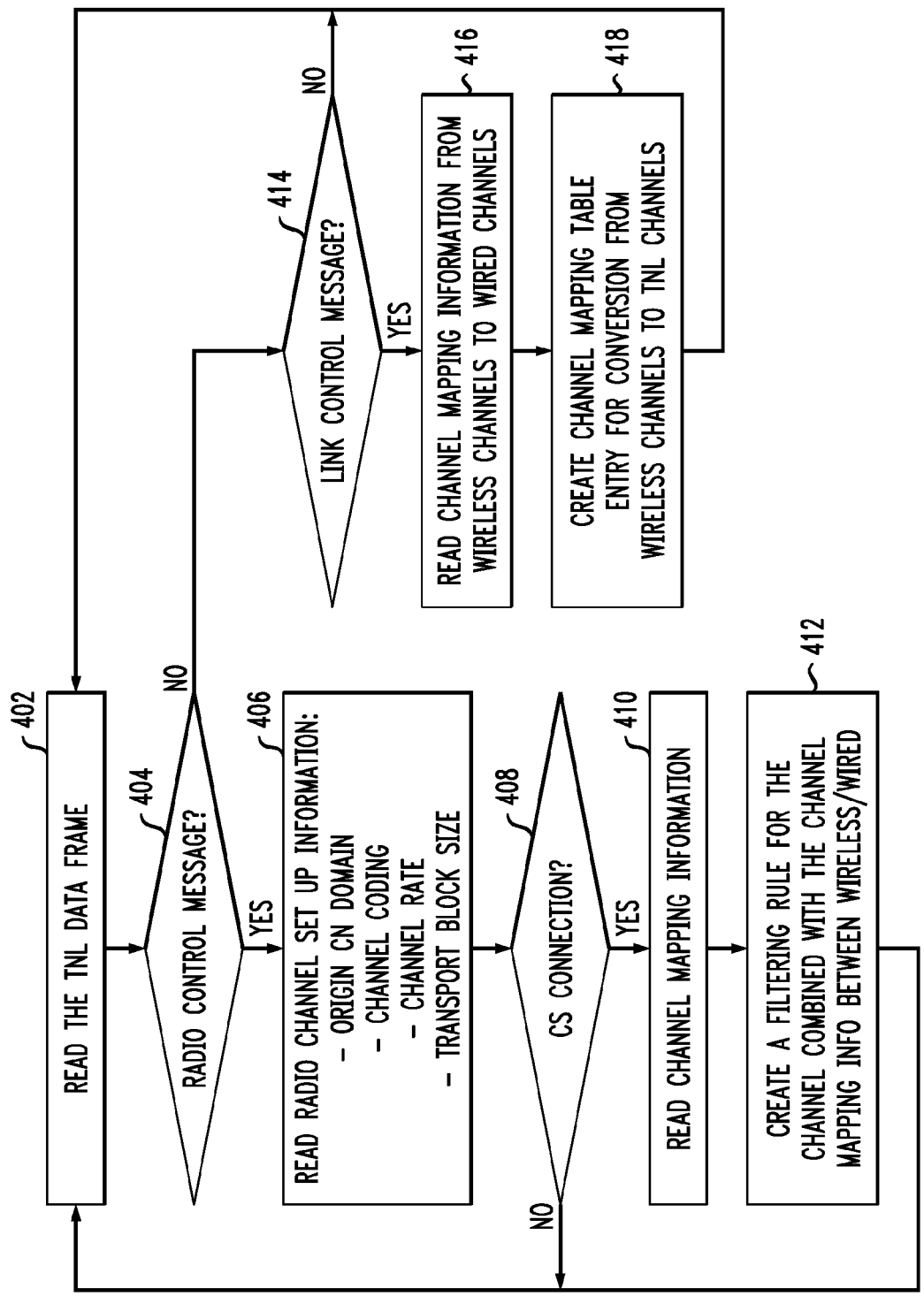
FIG. 4 is a diagram illustrating an exemplary methodology for segregating CS traffic from PS traffic using a control message sniffer according to an embodiment of the present invention.

FIG. 4 is a diagram illustrating an exemplary methodology 400 for segregating CS traffic from PS traffic using a control message sniffer (such as the control message sniffer of FIG. 3). According to an exemplary embodiment, the steps of methodology 400 are carried out by the control message sniffer. In step 402, a given TNL data frame is read (i.e., so as to identify Radio Control and Link Control messages). In step 404, it is determined whether or not the TNL data frame contains a Radio Control message. Determining whether a given TNL data frame contains a Radio Control message or not is a straight-forward exercise, as the radio control messages are carried within pre-defined TNL channel. If the TNL data frame contains a Radio Control message, then in step 406, the control message sniffer sniffs the RRC message for origin CN domain information, physical channel information (such as rate, coding, etc.), transport channel information (such as transport block (TB) size), and/or RLC mode information. See description of FIG. 3 above. From the information obtained in step 406, a determination is then made in step 408 as to whether the TNL data frame is CS user traffic.

If the data frame is not CS user traffic, then the method reverts back to step 402 with another TNL data frame. On the other hand, if the data frame is CS traffic, then in step 410, the control message sniffer is used to read channel identification information from wireless channels to wired channels. See description of FIG. 3 above. In step 412, a filtering rule is created for the channel combined with the channel identification information between wireless channels to wired channels, so that when a radio bearer is identified to be a CS connection, its mapping to the lower layer wireless channel and further mapping of the lower layer wireless channel to the TNL channel, obtained through the steps 414, 416, and 418, is included in a filtering rule. The method is then repeated with another TNL data frame.

If in step 404 (see above) it determined that the TNL data frame does not contain a Radio Control message, then in step 414 a determination is made as to whether or not the TNL data frame contains a Link Control message. If the TNL data frame does not contain a Link Control message, then the method reverts back to step 402 with another TNL data frame. On the other hand, if the TNL data frame does contain a Link Control message, then in step 416, the control message sniffer is used to read channel identification information from wireless channels to wired channels. Namely, in the present method, whether a user connection is CS or not is identified by reading the information regarding the channel in the "wireless" channel, whereas the offloading decision shall be made at the corresponding channel at the wired link between NodeB and RNC. So this mapping information (from wireless channels to wired channels) will be needed to do the latter to identify data frames in the wired channels. In step 418, a channel mapping table entry is created for conversion from wireless channels to TNL channels. This mapping information is then used to map the higher-layer CS user connections, identified in the steps 406 through 410, to the TNL channels, such that data frames that belong to the CS user connections can be segregated at the TNL. The method is then repeated with another TNL data frame.

Figure 5:
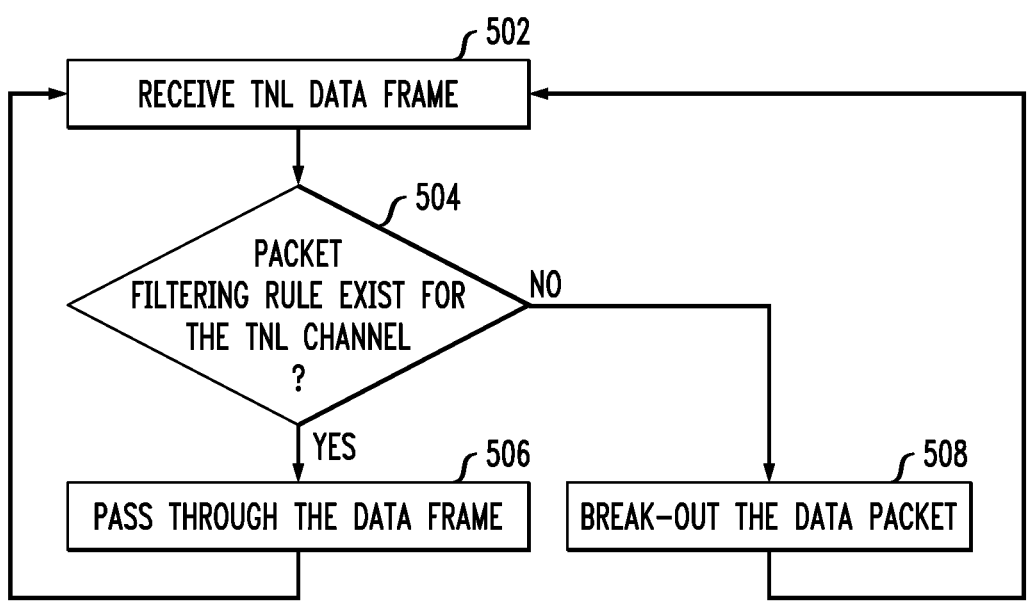
FIG. 5 is a diagram illustrating an exemplary methodology for using a CS packet filter to segregate CS traffic from PS traffic according to an embodiment of the present invention.

FIG. 5 is a diagram illustrating an exemplary methodology 500 for using a CS packet filter (such as the packet filter of FIG. 3) to segregate CS traffic from PS traffic. In step 502, the packet filter receives a given TNL data frame being transmitted from the Node B to the RNC (see FIG. 3). A filter is a simple decision engine that selectively breaks out the data frames according to whether a rule of break-out exists for a particular TNL channel or not. The CS packet filter is an engine that selectively does not break out data frames in TNL layer if a filtering rule exists for the TNL channel that a data frame belongs. If a filtering rule does not exist for a particular TNL channel, this signifies the data frames in that TNL channel may not belong to CS user connection, hence those data frames are broken out by the packet filter. As described above, the radio control messages (i.e., Radio Bearer Setup Messages) set up wireless channels between the UE and the RNC. Thus, in step 504, a determination is made as to whether a packet filtering rule exists for the given TNL channel. By way of example only, a packet filtering rule is created in step 412 of methodology 400 (FIG. 4), see above. As described with reference to methodology 400, a packet filtering rule is created when a Radio Control message is found in the TNL data frame and a CS connection is identified from the channel set up information.

If in step 504 it is determined that a packet filtering rule exists for the channel (i.e., the connection contains CS traffic), then in step 506, the CS packet filter allows the given TNL data frame to pass therethrough. Thus, by way of reference to FIG. 3, described above, that TNL data frame will pass to the RNC. The method is then repeated with another TNL data frame.

On the other hand, if it is determined that a packet filtering rule does not exist for the channel (i.e., the connection contains PS traffic), then in step 508, the CS packet filter breaks out (i.e., offloads) that TNL data frame. The method is then repeated with another TNL data frame. The offloaded data frames then will be further processed by other systems that constitute an IP offloading system; for example, the offloaded TNL data frames can be further processed (i.e., de-capsulated) at the higher layers of protocol stack so that IP packets can eventually be extracted from the TNL data frames, and the extracted IP packets may be sent to the public Internet.

Figure 6:
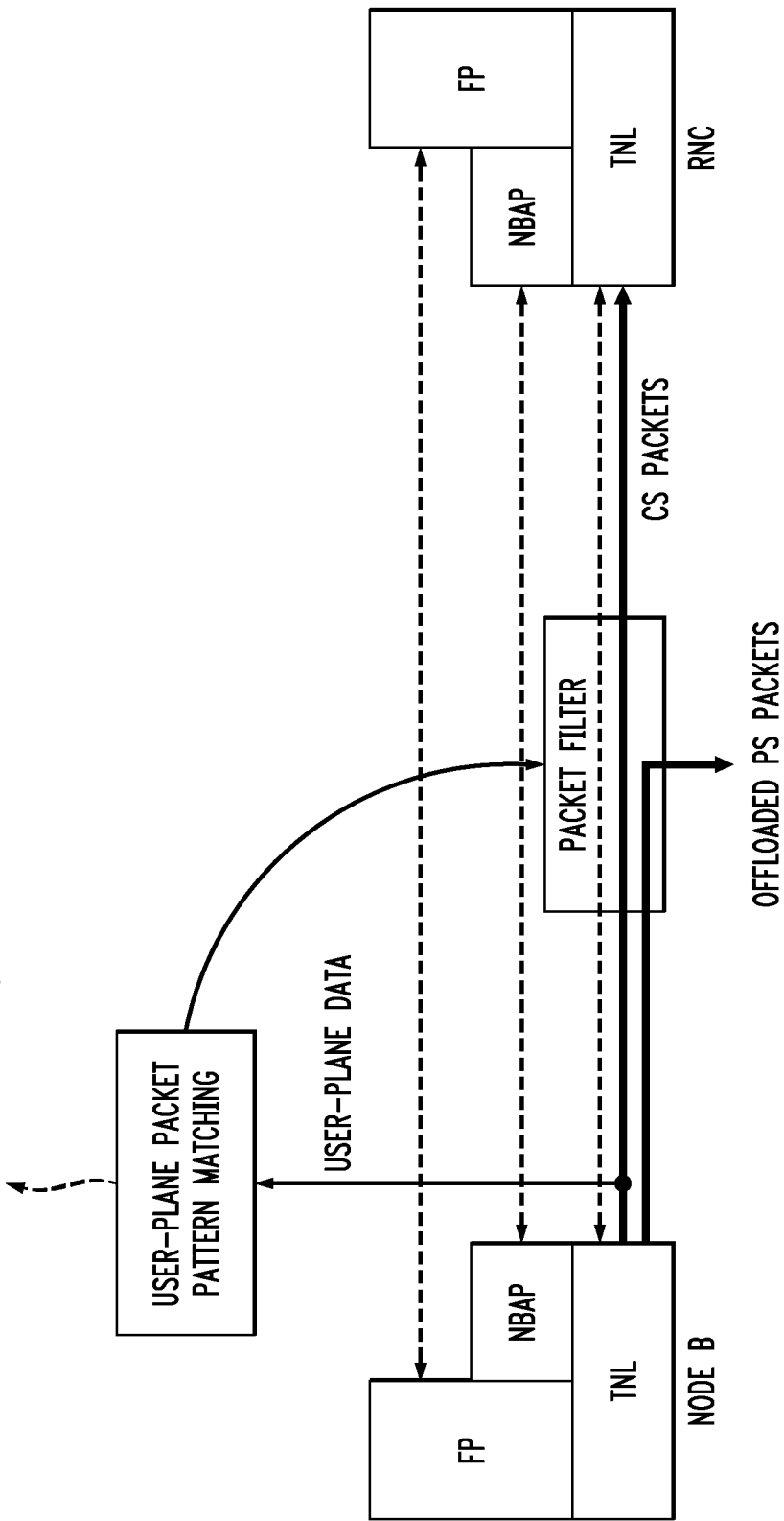
FIG. 6 is a diagram illustrating an exemplary methodology for using user-plane data analysis to segregate CS user connection traffic from PS user connection traffic according to an embodiment of the present invention.

Instead of using control-plane information, in an alternative embodiment, user-plane data analysis is used to segregate circuit switched (CS) user connection traffic from packet switched (PS) user connection traffic. See FIG. 6. Namely, FIG. 6 illustrates an alternative method for segregating CS and PS traffic which involves monitoring and analyzing the actual user data traffic flowing between the NodeB and the RNC. In the figures presented herewith (see also, for example FIG. 3, described above) the solid black arrows represent the actual user data traffic, whereas the dashed arrows represent control message connections at different protocols. In this case (FIG. 6), both the message sniffer and the packet filter will monitor the actual user data traffic, while in FIG. 3, the sniffer monitors the control messages and packet filter monitors the user data.

It is notable that this alternative method can be used to supplement or can be applied independently to the method using the information available in the control messages between the UE and RNC. This alternative method is particularly useful when the information available in the radio control message for the purpose of separating CS connections from PS connections (e.g., as per methodology 500 of FIG. 5) is not sufficient, or when the control plane information is not indicative of the nature of the user connection (e.g., use of VoIP in the PS domain).

As described above, data with different logical channels in the Frame Protocol are assigned to and carried by different logical channels in the TNL. In the present method, the data frames that carry the user data traffic are monitored for the first few (k) frames of each logical channel set up in the TNL, and by applying techniques of analyzing the characteristics of the data flow in the particular channels. The first few data frames constitute statistical samples into the statistical analysis, and the number (k) of first frames to analyze can be determined based on accuracy and processing considerations. Namely, there is a tradeoff between the accuracy and the overhead of the statistical analysis techniques with respect to the samples being monitored and analyzed, i.e., the more the samples are monitored and analyzed, the more accurate becomes the result of statistical analysis techniques, but the higher becomes the overhead of analysis. Typically, a few tens of data frames will yield sufficiently accurate analysis results.

Again here, the data frames can be monitored using a message sniffer (here a user-plane message sniffer) at the link between the NodeB and the RNC. As highlighted above, message sniffers use pattern recognition techniques and machine learning technology to analyze messages. Thus, by monitoring the data frames the user-plane message sniffer can identify characteristics of the data flow which indicate whether a particular channel is carrying CS user traffic or PS user traffic. By way of example only, as will be described in detail below, the user-plane message sniffer can be used to compare patterns of data flow characteristics to known characteristic patterns of CS and PS traffic to identify CS and PS traffic in the data flow.

Several characteristics can be used by the message sniffer that monitors user data to identify CS traffic in the data flow. One useful data flow characteristic is the inter-arrival times of the data frames in the same TNL channels. For example, the data frames in the CS connection tend to be generated and transferred more regularly, so the inter-arrival times between successive data frames for CS connections tend to be fixed, whereas those for PS connections are generally irregular (non-fixed).

Another useful characteristic is a distribution of sizes of the data frames in TNL, as the data frames in the CS traffic generally are fixed across different data frames, while those for PS traffic tend to be arbitrary. For example, most voice codecs have their pre-determined voice payload sizes per each packet (e.g., 20 bytes for G.729, 160 bytes for G.711, 80 bytes for G.726, etc.), so the data frames in TNL that belong to the same voice connection have the same size when fixed-size headers are added to the voice payload by different layers in the protocol stack.

Yet another useful characteristic is a configuration of the payload portion of the data frames, which can be investigated and matched against one or more rules that define patterns in the contents of packets carrying CS traffic, using techniques such as DPI (Deep Packet Inspection). DPI techniques investigate not just the packet headers typically used to identify the source and destination of the packet, the type of the packets, etc., but also the contents of the packets including their payload portion, compare the contents of the packets against a set of rules that define the patterns of the contents (e.g., the patterns of binary bit sequence in the packet), and output the Boolean results of the comparison (match or unmatch) or the classification results (i.e., which rules the packet's contents matched). CS traffic is typically generated by a known set of codecs used for the compression of such traffic, and each codec typically leaves unique signatures that can be used to identify what is being used to encode the user traffic. For example, if RTP (Real-time Transport Protocol) is used to carry CS traffics, the RTP version number along with the RTP sequence number incremented by 1 at each successive RTP packet within the single voice connection can be identified at the fixed offset position of the TNL data frame and can be used to determine the data stream carried in the TNL channel are carrying CS user traffic. The user-plane message sniffer can be configured to identify these characteristics as described above.

As provided above, the pattern matching of the user data flows and the contents of individual packets against the known signatures can be carried out across multiple packets on a particular channel to improve its accuracy through statistical analysis technique. For example, multiple samples of the inter-arrival times of the packets or the sizes of the packets can be measured, and these sample values can be fed into a detection technique to determine whether the variance of the inter-arrival times is small enough (e.g., within a threshold determined by a certain confidence interval in the statistical distribution). For another example, when the patterns inside each individual packet are matched against a set of known signatures, the matching results of the multiple packets can be used in statistical detection methods, such as hypothetical testing algorithms, to obtain statistically significant result of the detection after removing the effect of the errors in individual matching results.

Once the above characterization after monitoring the first few data frames of a channel and the decision as to whether that channel is a CS or PS channel, that decision is fed into the packet filter (see FIG. 6) that monitors and segregates the data frames (e.g., by offloading packets) belonging to channels for CS connections from those for PS connections using the channel identifier information in the data frame header of Transport Network Layer. The techniques for using a user-plane message sniffer to segregate CS traffic and PS traffic is provided with reference to FIG. 7 below.

Figure 7:
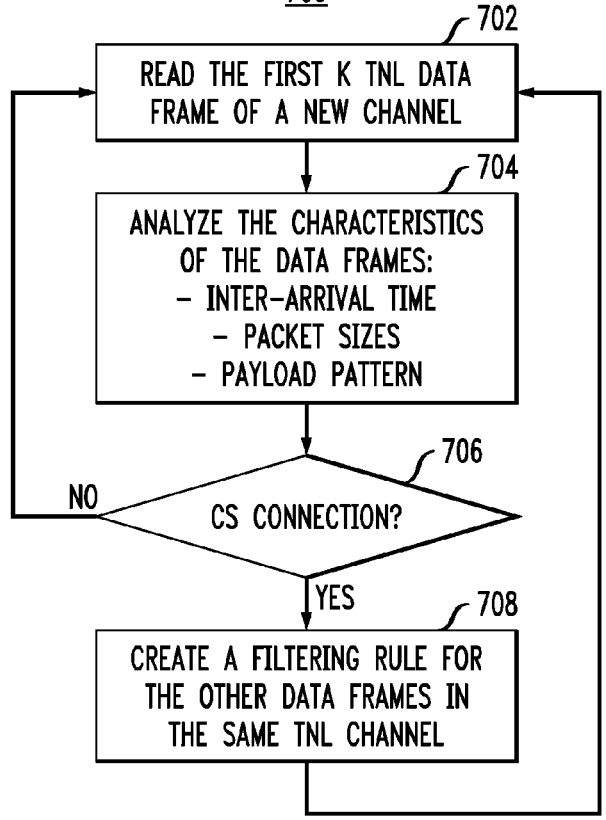
FIG. 7 is a diagram illustrating an exemplary methodology for segregating CS traffic from PS traffic using a user-plane message sniffer according to an embodiment of the present invention.

FIG. 7 is a diagram illustrating an exemplary methodology 700 for segregating CS traffic from PS traffic using a user-plane message sniffer (such as the user-plane message sniffer of FIG. 6). According to an exemplary embodiment, the steps of methodology 700 are carried out by the user-plane message sniffer.

In step 702, the user-plane message sniffer is used to read the first few frames (i.e., first k data frames) of a new channel. In step 704, characteristics of the frames read in step 702 are analyzed. As described above, the user-plane message sniffer can be used to match patterns in the data flow with known patterns relating to inter-arrival time, packet size and payload configuration. These characteristics may be used to distinguish CS traffic from PS traffic.

In step 706, a determination is made based on the analysis performed in step 704, as to whether the channel is a CS connection. If not, then the method reverts back to step 702 with a different channel. On the other hand, if in step 706 it is determined that the channel is a CS connection, then in step 708, a filtering rule is created for the other data frames in the same channel. The premise of this present method is to monitor and analyze only a few data frame samples to determine whether the entire stream of the data frames, including the rest of the unmonitored data frames that follow, belong to CS connection or not. So once identified to be a CS connection, this filtering rule will be used for the other data frames that belong to the "same TNL channel" at a later time. The method is then repeated with a different channel.

Reference may be made to methodology 500 (of FIG. 5) for the functioning of the packet filter, since the packet filter in this embodiment functions in the same manner as described above. For example, as described in conjunction with the description of FIG. 5, if a packet filtering rule exists then the data frames pass through the filter, otherwise the data frames are offloaded.

Figure 8:
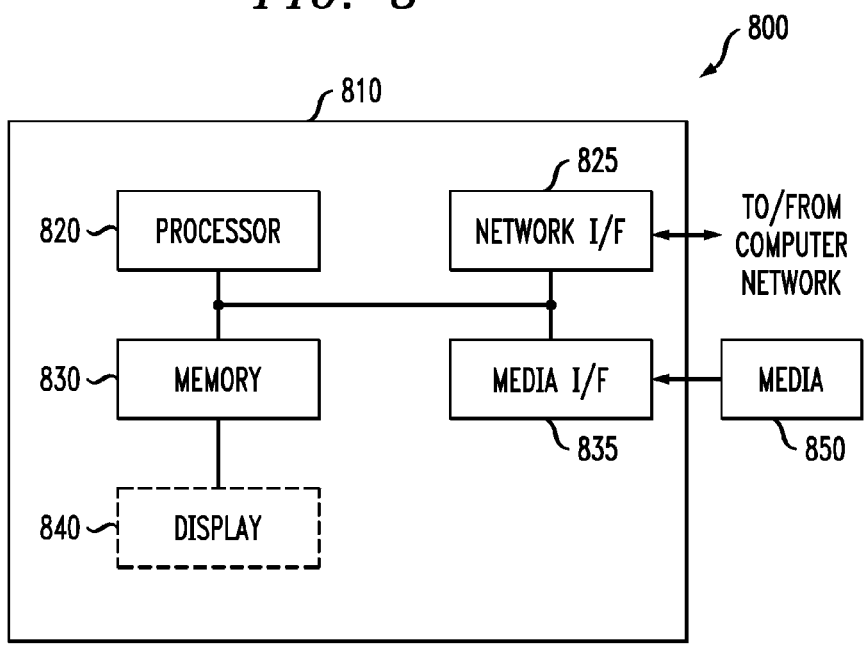
FIG. 8 is a diagram illustrating an exemplary apparatus for performing one or more of the methodologies presented herein according to an embodiment of the present invention.

Turning now to FIG. 8, a block diagram is shown of an apparatus 800 for implementing one or more of the methodologies presented herein. By way of example only, apparatus 800 can be configured to implement one or more of the steps of methodology 400 of FIG. 1 and/or methodology 700 for processing user data traffic in a radio access network, e.g., by segregating CS traffic from PS traffic.

Apparatus 800 comprises a computer system 810 and removable media 850. Computer system 810 comprises a processor device 820, a network interface 825, a memory 830, a media interface 835 and an optional display 840. Network interface 825 allows computer system 810 to connect to a network, while media interface 835 allows computer system 810 to interact with media, such as a hard drive or removable media 850.

As is known in the art, the methods and apparatus discussed herein may be distributed as an article of manufacture that itself comprises a machine-readable medium containing one or more programs which when executed implement embodiments of the present invention. For instance, the machine-readable medium may contain a program configured to read a flow of data frames to and from the mobile user equipment passing between the base station and the Radio Network Controller (RNC), wherein one or more of the data frames contain control messages and one or more other of the data frames contain user data; analyze the control messages contained in the data frames for channel identification information that indicates whether the data frames that contain the user data contain circuit-switched user data or packet-switched user data; and segregate the data frames that contain the circuit-switched user data and the data frames that contain the packet-switched user data at a transport network layer between the base station and the Radio Network Controller (RNC) based on the channel identification information.

The machine-readable medium may also contain a program configured to analyze the user data for characteristics that indicate whether the user data comprises circuit-switched user data or packet-switched user data; and segregate the circuit-switched user data and the packet-switched user data at the transport network layer between the base station and the radio network controller based on the characteristics of the user data.

The machine-readable medium may be a recordable medium (e.g., floppy disks, hard drive, optical disks such as removable media 850, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 820 can be configured to implement the methods, steps, and functions disclosed herein. The memory 830 could be distributed or local and the processor device 820 could be distributed or singular. The memory 830 could be implemented as an electrical, magnetic or optical memory, or any combination of these or other types of storage devices. Moreover, the term "memory" should be construed broadly enough to encompass any information able to be read from, or written to, an address in the addressable space accessed by processor device 820. With this definition, information on a network, accessible through network interface 825, is still within memory 830 because the processor device 820 can retrieve the information from the network. It should be noted that each distributed processor that makes up processor device 820 generally contains its own addressable memory space. It should also be noted that some or all of computer system 810 can be incorporated into an application-specific or general-use integrated circuit.

Optional display 840 is any type of display suitable for interacting with a human user of apparatus 800. Generally, display 840 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A computer-based method for processing user data traffic in a radio access network in which mobile user equipment can communicate with a Radio Network Controller (RNC) through a base station, the method comprising the steps of:
   reading a flow of data frames to and from the mobile user equipment passing between the base station and the RNC, wherein one or more of the data frames contain control messages and one or more other of the data frames contain user data;
   analyzing the control messages contained in the data frames for channel identification information and characteristics that indicates whether the data frames that contain the user data contain circuit-switched user data or packet-switched user data; and
   segregating the data frames that contain the circuit-switched user data and the data frames that contain the packet-switched user data at a transport network layer in a wired link in the radio access network between the base station and the RNC based on the channel identification information and the characteristics using a data packet filter between the base station and the RNC, wherein the data packet filter is configured to perform the steps of:
   selectively allowing a given one or more of the data frames in the transport network layer to pass through the data packet tilter if a packet filtering rule exists for a channel in the transport network layer to which the given one or more data frames belong, otherwise offloading the given one or more data frames, and wherein packet filtering rules are created when the control messages comprise radio control messages found in the data frames and a circuit-switched connection is identified from channel set up information;
   wherein the characteristics that indicate whether the user data comprises circuit-switched user data or packet-switched user data comprise one or more of inter-arrival times of the data frames, a distribution of sizes of the data frames and a configuration of a payload of the data frames.

2. The method of claim 1, wherein the radio access network is part of a universal mobile terrestrial system (UMTS).

3. The method of claim 1, further comprising the step of: identifying the control messages in the data frames.

4. The method of claim 3, wherein the step of identifying the control messages in the data frames and the step of analyzing the control messages for the channel identification information are performed using a message sniffer.

5. The method of claim 1, further comprising the step of: determining if the control messages are radio control messages.

6. The method of claim 1, further comprising the step of: determining if the control messages are link control messages.

7. The method of claim 5, wherein one or more of the control messages are radio control messages and wherein the channel identification information comprises one or more of origin core network domain information, physical channel information, transport channel information, and RLC (Radio Link Control) mode information.

8. The method of claim 7, wherein the physical channel information comprises one or more of error-correction coding rate and information coding method.

9. The method of claim 7, wherein the transport channel information comprises transport block size.

10. The method of claim 6, wherein one or more of the control messages are link control messages, the method further comprising the step of:
    reading the channel identification information from wireless channels to wired channels.

11. The method of claim 1, further comprising the steps of:
analyzing the user data for the characteristics that indicate whether the user data comprises circuit-switched user data or packet-switched user data; and segregating the circuit-switched user data and the packet-switched user data at the transport network layer between the base station and the RNC based on the characteristics of the user data.

12. The method of claim 11, further comprising the step of:
analyzing a first k of the data frames of each logical channel in the transport network layer between the base station and the RNC for the characteristics that indicate whether the user data comprises circuit-switched user data or packet-switched user data.

13. The method of claim 1, further comprising the steps of:
analyzing patterns in the flow of the data frames at the transport network layer; and
matching the patterns in the flow of the data frames with known patterns of circuit-switched user data and known patterns of packet-switched user data.

14. The method of claim 1, further comprising the steps of:
analyzing signatures of the data frames at the transport network layer; and
matching the signatures of the data frames with known signatures of data frames that contain circuit-switched user data and known signatures of data frames that contain packet-switched user data.

15. A computer-based method for processing user data traffic in a radio access network in which mobile user equipment can communicate with a Radio Network Controller (RNC) through a base station, the method comprising the steps of:
reading a flow of data frames to and from the mobile user equipment passing between the base station and the RNC, wherein one or more of the data frames contain control messages and one or more other of the data flames contain user data;
analyzing the user data for characteristics that indicate whether the data frames that contain the user data contain circuit-switched user data or packet-switched user data; and
segregating the data frames that contain the circuit-switched user data and the data frames that contain the packet-switched user data at a transport network layer in a wired link in the radio access network between the base station and the RNC based on the characteristics of the user data using a data packet filter between the base station and the RNC, wherein the data packet filter is configured to perform the steps of:
selectively allowing a given one or more of the data frames in the transport network layer to pass through the data packet filter if a packet filtering rule exists for a channel in the transport network layer to which the given one or more data frames belong, otherwise offloading the given one or more data frames, and wherein packet filtering rules are created when the control messages comprise radio control messages found in the data frames and a circuit-switched connection is identified from channel set up information;
wherein the characteristics that indicate whether the user data comprises circuit-switched user data or packet-switched user data comprise one or more of inter-arrival times of the data frames, a distribution of sizes of the data frames and a configuration of a payload of the data frames.

16. The method of claim 15, wherein the step of reading the flow of data frames and the step of analyzing the user data are performed using a message sniffer.

17. The method of claim 15, further comprising the step of:
analyzing a first k of the data frames of each logical channel in the transport network layer between the base station and the RNC for the characteristics that indicate whether the user data comprises circuit-switched user data or packet-switched user data.

18. An apparatus for processing user data traffic in a radio access network in which mobile user equipment can communicate with a Radio Network Controller (RNC) through a base station, the apparatus comprising: a memory; and at least one processor device, coupled to the memory, operative to:
read a flow of data frames to and from the mobile user equipment passing between the base station and the RNC, wherein one or more of the data frames contain control messages and one or more other of the data frames contain user data;
analyze the control messages contained in the data frames for channel identification information and characteristics that indicates whether the data frames that contain the user data contain circuit-switched user data or packet-switched user data; and
segregate the data frames that contain the circuit-switched user data and the data frames that contain the packet-switched user data at a transport network layer in a wired link in the radio access network between the base station and the RNC based on the channel identification information and the characteristics using a data packet filter between the base station and the RNC, wherein the data packet filter is configured to perform the steps of: selectively allowing a given one or more of the data frames in the transport network layer to pass through the data packet filter if a packet filtering rule exists for a channel in the transport network layer to which the given one or more data frames belong, otherwise offloading the given one or more data frames, and wherein packet filtering rules are created when the control messages comprise radio control messages found in the data frames and a circuit-switched connection is identified from channel set up information;
wherein the characteristics that indicate whether the user data comprises circuit-switched user data or packet-switched user data comprise one or more of inter-arrival times of the data frames, a distribution of sizes of the data frames and a configuration of a payload of the data frames.

19. The apparatus of claim 17, wherein the at least one processor device is further operative to: analyzing the user data for the characteristics that indicate whether the user data comprises circuit-switched user data or packet-switched user data; and segregating the circuit-switched user data and the packet-switched user data at the transport network layer between the base station and the RNC based on the characteristics of the user data.

20. An article of manufacture for processing user data traffic in a radio access network in which mobile user equipment can communicate with a Radio Network Controller (RNC) through a base station, comprising a non-transitory machine-readable recordable medium containing one or more programs which when executed implement the steps of:
Controller (RNC) through a base station, the apparatus comprising: a memory; and at least one processor device, coupled to the memory, operative to:
read a flow of data frames to and from the mobile user equipment passing between the base station and the RNC, wherein one or more of the data frames contain control messages and one or more other of the data frames contain user data;

analyze the control messages contained in the data frames for channel identification information and characteristics that indicates whether the data frames that contain the user data contain circuit-switched user data or packet-switched user data; and segregate the data frames that contain the circuit-switched user data and the data frames that contain the packet-switched user data at a transport network layer in a wired link in the radio access network between the base station and the RNC based on the channel identification information and the characteristics using a data packet filter between the base station and the RNC, wherein the data packet filter is configured to perform the steps of: selectively allowing a given one or more of the data frames in the transport network layer to pass through the data packet filter if a packet filtering rule exists for a channel in the transport network layer to which the given one or more data frames belong, otherwise offloading the given one or more data frames, and wherein packet filtering rules are created when the control messages comprise radio control messages found in the data frames and a circuit-switched connection is identified from channel set up information;

wherein the characteristics that indicate whether the user data comprises circuit-switched user data or packet-switched user data comprise one or more of inter-arrival times of the data frames, a distribution of sizes of the data frames and a configuration of a payload of the data frames.

21. The article of manufacture of claim 20, wherein the one or more programs which when executed further implement the step of: analyzing the user data for the characteristics that indicate whether the user data comprises circuit-switched user data or packet-switched user data; and segregating the circuit-switched user data and the packet-switched user data at the transport network layer between the base station and the RNC based on the characteristics of the user data.

* * * * *